United States Patent [19]

Ogawa et al.

[11] 4,255,255
[45] Mar. 10, 1981

[54] TUBULAR MEMBRANE SEPARATION PROCESS AND APPARATUS THEREFOR

[75] Inventors: Toshio Ogawa, Takahagi; Katsuya Ebara, Mito; Sankichi Takahashi, Hitachi, all of Japan

[73] Assignees: Hitachi, Ltd.; Hitachi Plant Engineering and Construction Co., Ltd., both of Japan

[21] Appl. No.: 895,979

[22] Filed: Apr. 13, 1978

Related U.S. Application Data

[63] Continuation of Ser. No. 667,589, Mar. 17, 1976, abandoned.

[30] Foreign Application Priority Data

Mar. 22, 1975 [JP] Japan .................. 50-33534

[51] Int. Cl.$^2$ .................. B01D 31/00; B01D 13/00
[52] U.S. Cl. .................. 210/652; 210/335;
210/353; 210/355; 210/433.2
[58] Field of Search .......... 210/23 H, 23 F, 321 R,
210/321 A, 321 B, 433 M, 195.2, 253, 257 M,
258, 335, 353, 355; 134/7, 8, 10

[56] References Cited

U.S. PATENT DOCUMENTS

| | | | |
|---|---|---|---|
| 3,795,317 | 3/1974 | Van Zon | 210/321 R |
| 3,819,513 | 6/1974 | Ishii et al. | 210/321 R |
| 3,856,569 | 12/1974 | Strong | 210/23 F |

OTHER PUBLICATIONS

McCutchan et al., "Reverse Osmosis at Coelinga, California", a paper presented on May 22, 1969 at annual conf., AWWA, pp. 345-353.

*Primary Examiner*—Frank A. Spear, Jr.
*Attorney, Agent, or Firm*—Craig and Antonelli

[57] ABSTRACT

An apparatus and process for tubular membrane separation, such as reverse osmosis or ultrafiltration, with an arrangement for removing undesirable deposits from the semipermeable membrane surfaces. For the removal of the deposits, elastic elements are passed, together with the feed solution being treated, through the tubular modules lined with semipermeable membranes, separated from the solution, and are recycled with a fresh supply of the solution from a tank, so that the semipermeable membranes are continuously cleaned while separating a part of the solution by permeation therethrough.

15 Claims, 5 Drawing Figures

TUBULAR MEMBRANE SEPARATION PROCESS AND APPARATUS THEREFOR

This is continuation of application Ser. No. 667,589 filed Mar. 17, 1976, now abandoned.

The invention relates to a tubular membrane separation process and apparatus therefor suited for varied applications including purification of wastewater; desalination, concentration, separation, and purification of proteins, enzymes, and nucleic acids; treatment of industrial liquid wastes, such as plating solutions; and concentration and refining of chemicals.

Membrane separation techniques are used to separate molecules of different sizes in solutions subjected to pressure, with the aid of membranes. Of the processes based on pressure difference across a membrane, the one of separating relatively large molecules from small molecules, such as water, is called ultrafiltration. When a solution containing solute molecules of relatively small sizes, such as sodium chloride, is to be treated, a pressure greater than the normal osmotic pressure is applied to the solution for solute separation through the membrane. The process is known as reverse osmosis. The distinctions between these two techniques are not necessarily clearcut, since they both involve the separation of a solute from a solution by means of a membrane with the application of pressure. For the convenience of illustration the invention will be described below as embodied in a tube type apparatus for reverse osmosis.

The apparatus of the character uses semipermeable membranes which permit the passage of the solvent in a solution but hinders that of the solute, and comprises tubes of such membranes installed in pressure-resistant pipes. A solution to be treated is pressurized to a predetermined level by a pump, caused to flow through the tubular modules at a predetermined flow velocity, and the solvent that has permeated out through the membranes is collected. With the construction described, the apparatus is generally accepted as one for the treatment of liquids, especially of water.

To illustrate the construction in more detail, the individual modules of the tube type reverse osmosis apparatus consist of tubes of semipermeable membranes held in position by exterior support members of water-permeable material and placed in porous or perforated, pressure-resistant pipes. As a solution flows inside the tubes, part of the solvent moves through the membranes, support members, and pipe walls in the form of waterdrops trickling down over the outside surfaces of the pressure-resistant pipes. The drops are collected while the rest of the solution held back by the semipermeable membranes is separately discharged. The rest of the solution that has passed through the tubes unpermeatingly is called concentrated brine because its solute concentration is increased in proportion to the volume of the solvent lost by the permeation. The semipermeable membranes most often employed are made principally of organic cellulose acetate, and the membrane support members are fabricated from a fibrous material having a low resistance to water passage and capable of withstanding pressure to a certain degree. Examples of the pressure-resistant pipes are FRP (Fibre Reinforced Plastics) pipes and stainless steel pipes formed with tiny holes at given intervals throughout.

Normally water contains some suspended solids. Above all, the water that must be treated often contains, in addition to the suspended solids, organic matter and even heavy metals such as iron and manganese. In this connection, one of major problems yet to be solved for successful water treatment by reverse osmosis is the gradual deposition of such varied contents of water on the semipermeable membrane surfaces and a consequent decrease in the rate of water permeation. This is particularly true with the purification of wastewater having high organic contents, such as sewage, in which case the organic matter and suspended solids tend to slime the membrane surfaces. In case of inorganic wastewater which contains ions of readily oxidizable metals, such as iron and manganese, the fluid will deposit the oxides on the membrane surfaces. Thus, the sliming or deposition, whichever may occur, will result in a reduction in the permeation rate of water.

Removal of the deposits from the semipermeable membrane surfaces has hitherto been attempted in two ways. One proposed method is washing based on fluid mechanics whereby wash liquid is forced at a high velocity through the tubes to strip the deposits from the inside surfaces of the semipermeable membranes. The other is a chemical method which consists of adding a certain acid to the wash liquid so that the deposits are dissolved away from the membrane surfaces. It has, however, become clear that neither of the proposed methods can completely and easily remove the deposits from the membranes, and no commercially practical cleaning method has been established yet. This is because the deposits on the semipermeable membranes are slowly but incessantly formed during the operation of the reverse osmosis apparatus and, moreover, the deposits growing on the membrane surfaces are pressed thereagainst under such high pressure (operation pressure of 40-80 $kg/cm^2$ is common in the process of reverse osmosis) that the fluid-mechanical or chemical washing cannot eliminate the deposits completely.

Another disadvantage of the conventional washing methods is that, for each wash, it is necessary to interrupt the operation of the reverse osmosis apparatus, or cut off the system of the solution being treated, and substitute the wash liquid for the solution. Washing is usually performed once a day, each time for about 1 to 2 hours, and this daily downtime accordingly reduces the operation efficiency. An additional drawback of the chemical washing is that the washings cannot be disposed of before being treated somehow or other (for example, through the adjustment of its pH).

Therefore, it is an object of this invention to provide a tubular membrane separation apparatus which can rapidly and easily remove the deposits from the semipermeable membrane surfaces without damaging the membranes.

Another object of the invention is to remove the deposits continuously without using any special wash liquid, thereby improving the operation efficiency of the apparatus.

Yet another object of the invention is to provide a tubular membrane separation appratus which employs mechanical cleaning means for removal of the deposits from the semipermeable membrane surfaces, with no necessity of secondary measures to be taken after the cleaning.

An experiment was conducted to see how the growth of deposits on the semipermeable membrane surfaces reduces the quantity of water that passes through the membranes. It was found, as the result, that the permeation rate of water continues to decrease and, in about 30 hours of operation, the rate is reduced to about half, with a large amount of deposition on the semipermeable membrane surfaces. The experiment indicated that the solute in the solution begins to deposit on the semipermeable membrane surfaces immediately after the start of operation and, in the absence of a countermeasure, the deposition grows gradually. The operation pressure applied to the feed forces and deposits solidly and adhesively against the membrane surfaces and renders it difficult to strip the surfaces of the deposits. The present invention contemplates removing the deposits in the early stage of growth or before they become too adhesive to strip, by rubbing them off from the membrane surfaces with elastic elements, e.g., sponge balls. For the purpose of the invention, the term sponge balls is used to mean balls made of natural rubber or synthetic rubber, such as butyl, chloroprene, styrene-butadiene, high-styrene, nitrile, or urethane rubber. They are so formed as to be substantially softer than the semipermeable membranes to be encountered.

SUMMARY OF THE INVENTION

The present invention is characterized in that, in cleaning the semipermeable membrane surfaces of tubular modules with the sponge balls above referred to, the balls are forced, together with the solution being treated under pressure as a carrier solution, through the tubes of semipermeable membranes, and the balls after use for the cleaning purpose are recycled to the upstream side of the modules together with a fresh supply of the solution from a tank.

In this way the semipermeable membrane surfaces can be continuously cleaned by continuously passing the elastic elements through the tubes of semipermeable membranes, while a part of the solution is being separated as the permeated water, thus permitting uninterrupted operation of the apparatus. Also, because the fresh supply of the solution to be treated is utilized as the carrier for the recirculation of the sponge balls after the cleaning use, the solute concentration of the solution within the modules is kept substantially constant regardless of whether the sponge balls pass through the modules or not, and therefore a stable operation is made possible. It can be appreciated that the elastic elements can be continuously recycled in order to continuously clean the semipermeable membranes.

During the operation of a reverse osmosis apparatus, the solution to be treated is fed at a pressure between 40 and 80 kg/cm$^2$, whereas an ultrafiltration unit does not require such a high pressure but uses a pressure of at most 20 kg/cm$^2$. Another benefit derivable from the use of sponge balls in either equipment is that they make the streams of the solution turbulent and thereby equalize the osmotic pressures which otherwise vary locally. This is important because the apparatus' capacity of water permeation by membrane separation depends on the pressure applied to the solution being treated minus the normal osmotic pressure of the solution, and the osmotic pressure tends to be higher at the membrane surface of each tube than in the center of the tube.

It is to be understood that the washing means with sponge balls in conformity with this invention may be combined with any known fluid-mechanical or chemical washing method.

Also, it should be noted that heat is of very little importance in carrying the invention into practice.

BRIEF DESCRIPTION OF THE DRAWINGS

These and other objects, advantages and features of the invention will become more apparent from the following detailed description when taken in conjunction with the accompanying drawings, in which.

DETAILED DESCRIPTION OF THE INVENTION

Figure 1:
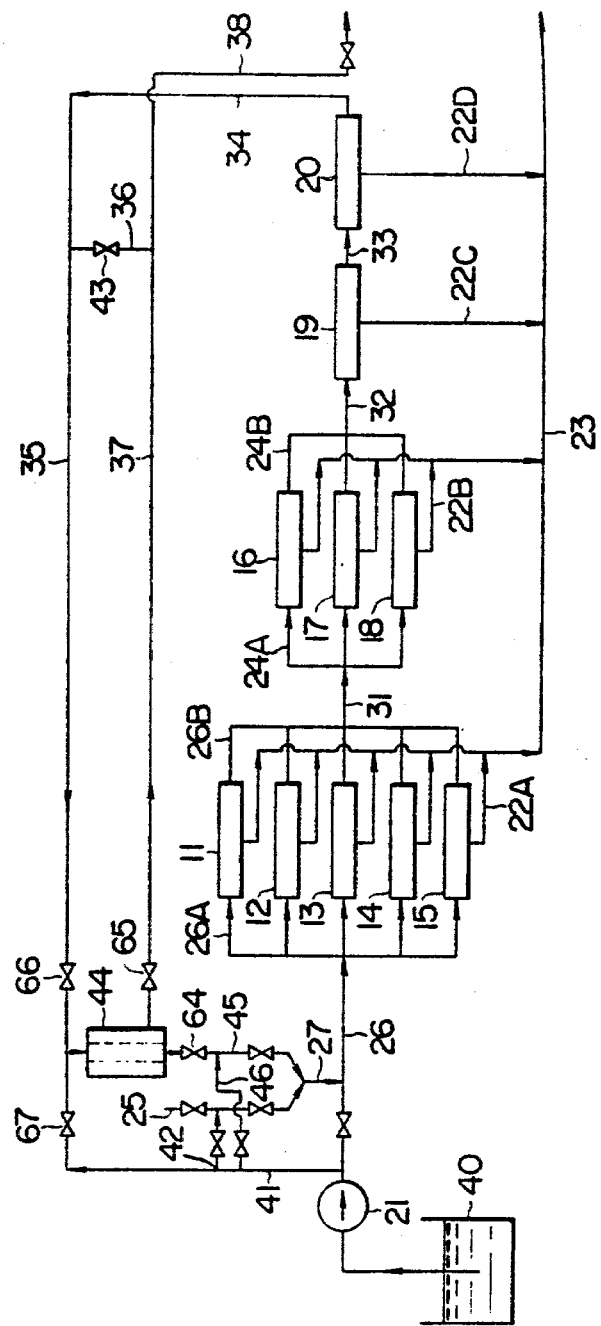
FIG. 1 is a flow sheet of an arrangement embodying the present invention.

Referring now to FIG. 1, there is shown an apparatus for reverse osmosis in accordance with the invention comprising a total of ten tubular membrane modules connected in multiple stages. The number of such modules is not critical but may be freely chosen to suit the type and quantity of the solution to be handled. In the embodiment shown, the modules are arranged in parallel and connected in four stages, i.e., five modules (indicated at 11–15) in the first stage, three (16–18) in the second state, and one each (19 and 20) in the third and fourth stages. A solution to be treated is subjected to a predetermined pressure and fed by a pump 21 from a tank 40 to the modules 11–15 in the first stage via a line 26 and branch pipes 26A. The solution in the first-stage tubular modules 11–15 is separated into permeated water that has moved through the semipermeable membrane tubes and concentrated brine that leaves the modules without permeating through the membrane tubes. The permeated water portions are taken out through outlet pipes 22A and collected in a collecting line 23. On the other hand, the brine is transferred to the second-stage modules 16–18 through branch pipes 26B, line 31, and branch pipes 24A.

In exactly the same manner as with the modules 11–15, the brine is treated in the second stage and the permeated water is taken out through outlet pipes 22B and collected in the line 23. Meanwhile, the concentrated brine flows through branch pipes 24B and line 32 into the third-stage module 19. Again, by the same procedure, the charge is separated into permeated water and concentrated brine which are led, respectively, through an outlet pipe 22C and line 33 to the collecting line 23 and the final-stage module 20. The procedure is followed once more and the permeated water is collected through an outlet pipe 22D into the collecting line and the finally concentrated brine is discharged through lines 34, 35, 36, 37 and 38. Usually, the feed solution is easily concentrated in this way, with the solute concentration eventually increased four- to five-fold. Also, the final concentration of the permeated water may be about one-tenth to one-twentieth the initial value of the solution and, depending on the quality of water treated, the water thus purified may be readily reused.

The sponge balls are fed as they fall by gravity from a ball feed line 25 into the line 26 through a line 27. Alternatively, they may be compulsorily fed by supplying the solution to the ball feed line 25 via lines 41, 42 and allowing the solution to carry the balls into the line 26. The balls are thus introduced by the solution being treated, the latter serving as a carrier, into the first-stage modules 11–15.

Past the modules 11–15, the sponge balls will flow together with the concentrated brine into the modules 16–18 of the next stage via the lines 26B, 31, 24A, and thence into the modules 19 and 20 of the ensuing stages. Throughout this period a valve 43 installed on the line 36 remains closed. The sponge balls that have left the last module 20 flow with the concentrated brine through the lines 34, 35 into a sponge ball collector 44, where the ball are recovered and stored therein while the brine is separated and discharged through the lines 37, 38. When recycling the sponge balls, the solution to be treated is admitted to the sponge ball collector 44 through a line 41 and is allowed to carry away the balls from the collector through lines 45, 27 into the line 26 for subsequent introduction into the tubular modules in the multiple stages as already described. In this manner a recycling system for the sponge balls is made. A line 46 is provided to facilitate the supply of the balls from the collector.

Figure 2:
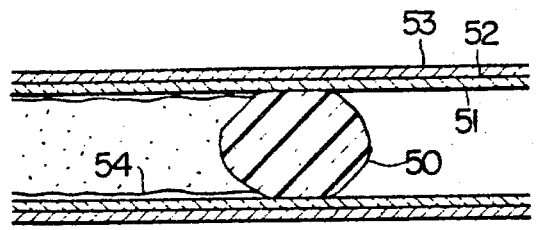
FIG. 2 is a typical sectional view of a tube with a sponge ball being forced therethrough.

The sponge balls achieve their mechanical cleaning effect as they pass, together with the solution or concentrated brine, through the modules 11–20 in contact with the inner surfaces of semipermeable membrane tubes, and rub off the deposits of contaminants and other solids from the membrane surfaces. The manner in which each sponge ball cleans the semipermeable membrane surface is typically represented in FIG. 2.

The semipermeable membrane 51 in a tubular form is surrounded by a semipermeable membrane support member 52, which in turn is held within a pressure-resistant pipe 53. Thus, the support member 52 is integrally combined with the pressure-resistant pipe 53 to constitute a semipermeable-membrane-backing tube. The sponge ball 50 has a diameter slightly larger than the inside diameter of the semipermeable membrane tube, so that the ball can rub off the deposits 54 at a stroke from the inner surface of the membrane tube. While a generally round ball has been illustrated, it should be understood that the invention is not limited thereto; the ball may be replaced by a number of sponge balls having a diameter less than the inside diameter of the tube of semipermeable membrane 51 (and which need not be round). Such smaller balls passed with the solution may clean the membrane surface as well.

Figure 3:
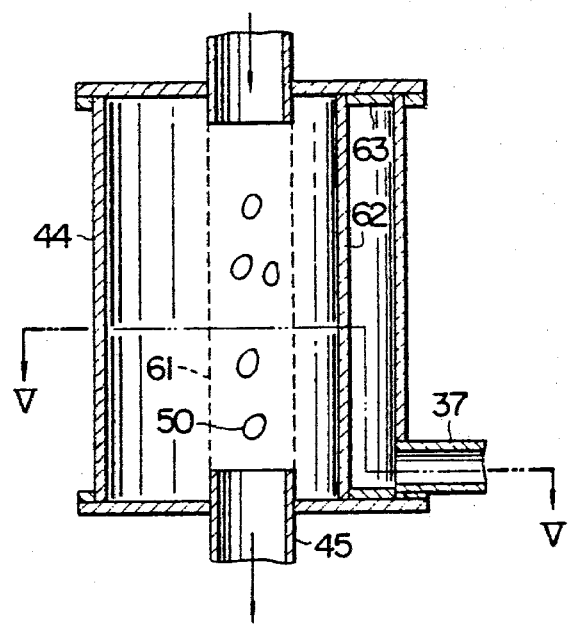
FIG. 3 is a vertical sectional view of a sponge ball collector.
Figure 4:
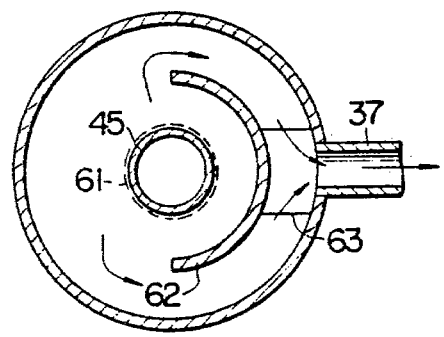
FIG. 4 is a sectional view taken along the line $\overrightarrow{V-V}$ of FIG. 3.

FIGS. 3 and 4 illustrate the sponge ball collector in detail.

Inside the casing of the collector 44 there is installed a recovery screen 61 in a cylindrical form, whereby the sponge balls are separated from the concentrated brine. The screen is, of course, fine enough to keep the balls 50 from passing therethrough. Between the recovery screen 61 and line 37 is erected a semicylindrical baffle plate 62 held by end supports 63 in place. The baffle plate avoids the direct inflow of the concentrated brine into the line 37 and permits the sponge balls 50 to descend smoothly within the recovery screen 61. The line 45 on the downstream side of the sponge ball collector 44 has a valve 64, and the line 37 has a valve 65. The lines 35 and 41 have valves 66 and 67, respectively.

Now if the valves 65, 66 are opened and the valves 64, 67 are closed, the concentrated brine will be separated from the sponge balls 50 by the recovery screen 61 and will be discharged through the lines 37, 38, while the balls are kept within the collector 44. After the sponge balls 50 have been collected in this way, the valves 65, 66 are closed and the valves 64, 67 are opened. The sponge balls 50 will then flow out, together with the solution to be treated, from the collector 44 through the lines 45, 27 into the line 26 for the cleaning of the inner surfaces of the semipermeable membrane tubes. The introduction of the sponge balls together with the solution from the tank into the reverse osmosis apparatus will make it possible to maintain the water quality of the solution inside the modules substantially constant and stabilize the quality of the permeated water, too.

Figure 5:
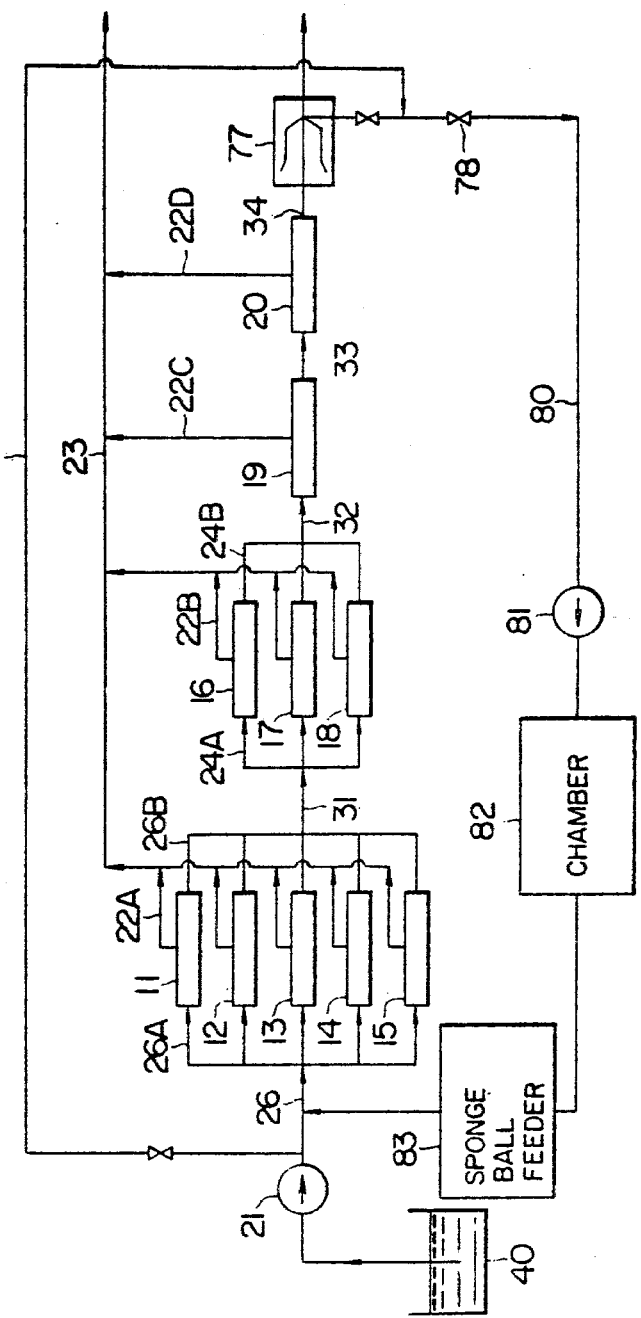
FIG. 5 is a flow sheet of another embodiment of the invention.

Another embodiment of this invention will be described below in connection with FIG. 5, where like parts have been given like numbers with respect to FIG. 1, and explanation of those parts is omitted.

The line 34 is provided with a sponge ball collector 77, where the sponge balls that have left the tubular membrane module 20 are trapped and the concentrated brine alone is discharged. The collected balls are then released through a line 78 and, with the aid of the solution supplied from the upstream of the first-stage modules 11–15 via a bypass line 79, carried through a sponge ball recycling line 80, and are finally collected in a sponge ball storage chamber 82 under a pressure increased by a booster pump 81. Next, the balls collected in the chamber 82 are transferred to a sponge ball feeder 83 and from which to the line 26. In this manner a system for recycling the sponge balls if formed.

As has been described above, it is possible in accordance with the present invention to remove deposits from semipermeable membrane surfaces simply by means of sponge balls and, because the carrier for the sponge balls is the solution being treated, the concentration of the solution within the tubular modules can be kept substantially constant and stable operation is ensured regardless of whether the sponge balls are passing through the modules or not.

What we claim is:

1. A tubular membrane separation apparatus comprising a plurality of modules composed of tubular semipermeable membranes and liquid-permeable support members surrounding the tubular membranes, said modules arranged in multiple stages, a solution tank for feeding a solution to be concentrated to the modules, said modules adapted to receive the solution together with elastic elements, means located on the downstream side of the modules in the substantially final stage to separate the concentrated solution and elastic elements and recover the elements, whereby the elements are stored in a recovery means, a first conduit means connected to the solution tank for conducting the solution from the tank to the recovery means, a second conduit means for supplying the elastic elements from the recovery means together solely with the solution to the upstream side of the modules in the substantially first stage, and means for introducing, under sufficient pressure to cause the solution concentration to increase, the solution from the tank together with the elastic elements being supplied by the second conduit means to the upstream side of the modules, the introducing means also including means for causing the solution to flow through the modules in a predetermined direction in a constant flow condition continuously and for causing the elastic elements to be continuously recycled through the modules in the predetermined direction of flow of the solution without disturbing the constant flow condition of the solution, whereby said elastic elements continuously clean said membranes while said membranes continuously treat said solution to concentrate said solution.

2. An apparatus according to claim 1, wherein the elastic elements are substantially softer than the semipermeable membranes to be encountered.

3. An apparatus according to claim 1, wherein the recovery means comprises a casing, a recovery screen installed in the casing to trap and separate the elastic elements from the concentrated solution, a conduit means for introducing the concentrated solution and elastic elements together from the modules into the recovery means, a conduit means for discharging the concentrated solution separated from the elastic elements, and a conduit means for supplying the separated elastic elements to the upstream side of the module, all of said conduits means connected to the casing.

4. An apparatus according to claim 3, wherein the recovery screen is cylindrically shaped and connected at one end of the conduit means for introducing the concentrated solution and elastic elements together into the recovery means and connected at the other end to the conduit means for supplying the separated elastic elements to the upstream side of the modules.

5. An apparatus according to claim 3, wherein a baffle plate is set up between the recovery screen and the conduit means for discharging the separated solution.

6. In a tubular membrane separation process which includes surrounding tubular semipermeable membranes by liquid-permeable support members to provide modules, arranging a plurlity of units of said modules in a manner such that the modules are connected together in multiple stages ranging from a stage at which a solution to be treated has a lower concentration to a stage at which the solution has a higher concentration, feeding said solution to the interior of said tubular semipermeable membranes, and collecting a liquid that has passed through the membranes under pressure while taking out a concentrated solution from the interior of the tubular membranes, the improvement comprising the steps of forcing a plurality of elastic elements, together with the solution to be treated, through the tubular semipermeable membranes, the solution being forced to flow through the modules continuously in a predetermined direction in a constant flow condition and the elastic elements being continuously recycled in the predetermined direction of flow of the solution without disturbing the constant flow condition of the solution, whereby said elastic elements continuously clean said membranes while said membranes continuously treat said solution to concentrate said solution, separating the used elastic elements from the concentrated solution to store the elastic elements in a collector, and then supplying the elastic elements in the collector to the upstream side of the modules together solely with a fresh quantity of the solution from a solution source, whereby the elastic elements are recycled.

7. In a tubular membrane separation process which includes surrounding tubular semipermeable membranes by liquid-permeable support members to provide modules, arranging a plurality of units of said modules in a manner such that the modules are connected together in multiple stages ranging from a stage at which a solution, from a solution source, to be treated has a lower concentration to a stage at which the solution has a higher concentration, feeding said solution to the interior of said tubular semipermeable membranes, and collecting a liquid that has passed through the membranes under pressure while taking out a concentrated solution from the interior of the tubular membranes, the improvement comprising the steps of feeding a plurality of elastic elements, together with the solution to be treated, through the tubular semipermeable membranes, the solution being forced to flow through the modules continuously in a predetermined direction in a constant flow condition and the elastic elements being continuously recycled in the predetermined direction of flow of the solution without disturbing the constant flow condition of the solution, whereby said elastic elements continuously clean said membranes while said membranes continuously treat said solution to concentrate said solution, separating the used elastic elements from the concentrated solution, holding the used elastic elements in a collector, and then recycling the elastic elements solely by a fresh quantity of solution from a solution source whereby the elastic elements can be supplied with the solution from the solution source to the upstream side of the modules.

8. A process according to claim 7, wherein said solution is brine.

9. A process for removing a deposit from the interior surface of a tubular semipermeable membrane by means of elastic elements, said tubular semipermeable membrane surrounded by a liquid-permeable support member to form a separation module, a plurality of said modules being arranged in parallel to form a plurality of units, said units being connected in series, a last unit of said series including at least one of said modules, and said deposit resulting from treatment of a solution which increases in concentration by passage through said separation module, comprising:
  (a) providing a given number of said elastic elements to said solution;
  (b) providing said solution comprising said elastic elements to said plurality of separation modules in an initial unit having a plurality of said separation modules;
  (c) causing under applied pressure said solution comprising said elastic elements of step (b) to pass through said units so that a deposit on said interior surface of said membrane is removed and said solution is concentrated;
  (d) separating said elastic elements from said concentrated solution after passage through a module of said last unit;
  (e) holding the separated elastic elements in a collector; and
  (f) recycling said separated elastic elements to said initial unit solely with untreated solution, causing the solution to flow through the modules continuously in a predetermined direction in a constant flow condition and continuously recycling the elastic elements in the predetermined direction of flow of the solution without disturbing the constant flow condition of the solution.

10. A tubular membrane separation apparatus comprising a plurality of modules composed of tubular semipermeable membranes and liquid-permeable support members surrounding the tubular membranes, a solution tank for feeding a solution to be treated to the modules, said modules being adapted to receive the solution together with elastic elements, means located on the downstream side of the modules to separate the concentrated solution and elastic elements and recover the elements, a first conduit means for introducing the solution to be treated from the tank to the recovery means, a second conduit means for supplying the elastic elements together with the solution being introduced by said first conduit means to the upstream side of the modules, and means for introducing the elastic elements together with the solution, under sufficient pressure to cause the solution concentration to increase as the solution passes through the modules, to the upstream side of the modules, whereby the elastic elements are recycled, the introducing means including means for causing the solution to flow through the modules continuously in a predetermined direction in a constant flow condition and means for continuously recycling the elastic elements in the predetermined direction of flow of the solution without disturbing the constant flow condition of the solution, whereby the elastic elements continuously clean the membranes while the membranes continuously treat the solution to concentrate the solution.

11. A tubular membrane separation apparatus wherein the membranes can be cleaned by elastic elements while said membranes act to concentrate a solution fed through the membranes, comprising:

a solution tank for feeding a solution to be treated;

a pump for supplying and pressurizing the solution from the solution tank;

a group of modules, each module comprising a tubular semipermeable membrane surrounded by a liquid-permeable support member, said group of modules being arranged such that the modules are in multiple stages;

a first conduit line and a means for introducing the pressurized solution, together with the elastic elements, to said group of modules, said first conduit line for introducing pressurized solution from the pump to the introducing means, with the introducing means connected to the first stage of said multiple stages;

the introducing means including means for causing the solution to flow through the modules continuously in a predetermined direction in a constant flow condition and means for continuously passing the elastic elements in the predetermined direction of flow of the solution without disturbing the constant flow condition of the solution;

a second conduit line located on the downstream side of the group of modules for taking out a concentrated solution from the group of modules;

a recovery means for separating elastic elements from the concentrated solution and storing the separated elastic elements;

a first bypass line connecting the recovery means to the first conduit line;

a second bypass line connecting the recovery means to the second conduit line; and means for controlling flow of the pressurized solution and concentrated solution whereby, when said second bypass line is open and said first bypass line is closed, said concentrated solution together with the elastic elements are supplied from the group of modules to the recovery means for separating the elastic elements, and whereby, when said bypass line is closed and said first bypass line is open, the pressurized solution is fed from the pump to the recovery means and elastic elements stored in the recovery means are forced, together with the pressurized solution, from the recovery means into the group of modules.

12. An apparatus according to claim 11, wherein said second bypass line comprises a first portion for flow of said concentrated solution from the second conduit line to the recovery means and a second portion for flow of the concentrated solution from the recovery means to the second conduit line, and said first bypass line comprises a first portion for flow of the pressurized solution from the first conduit line to the recovery means and a second portion for flow of the pressurized solution from the recovery means to the first conduit line.

13. An apparatus according to claim 12, wherein said means for controlling flow of the pressurized solution and concentrated solution comprises first valve means in the first conduit line between the intersection of the first conduit line with the first portion of the first bypass line and the second portion of the first bypass line, second and third valve means in the first and second portions of the first bypass line, respectively, a fourth valve means in the second conduit line between the intersection of the second conduit line with the first portion of the second bypass line and the second portion of the second bypass line, and fifth and sixth valve means in the first and second portions of the second bypass line, respectively, whereby, when the first, fifth and sixth valve means are open and the second, third and fourth valve means are closed, the concentrated solution and elastic elements are fed to the recovery means, and when the first, fifth and sixth valve means are closed and second, third and fourth valve means are open the pressurized solution is fed from the pump to the recovery means and elastic elements stored in the recovery means together with the pressurized solution are fed to the group of modules.

14. An apparatus according to claim 11, wherein the multiple stages of the group of modules are arranged from a stage at which a solution to be treated has a lower concentration to a stage at which the solution has a higher concentration, and wherein a larger number of modules are provided at lower concentration solution stages than at higher concentration solution stages.

15. An apparatus according to claim 11, wherein the recovery means comprises an inlet for introducing concentrated solution together with the elastic elements, an outlet for discharging the concentrated solution, a screen provided between the inlet and outlet so as to prevent discharge of the elastic elements through the outlet for discharging the concentrated solution, a storage portion for storing the elastic elements, an entrance opening for introduction of pressurized solution, and a discharge opening for discharging elastic elements together with pressurized solution.

* * * * *